United States Patent
Wu et al.

(10) Patent No.: US 9,008,442 B2
(45) Date of Patent: Apr. 14, 2015

(54) INFORMATION PROCESSING APPARATUS, INFORMATION PROCESSING METHOD, AND COMPUTER PROGRAM

(71) Applicant: Sony Corporation, Tokyo (JP)

(72) Inventors: Jianing Wu, Tokyo (JP); Yoshiaki Iwai, Tokyo (JP); Shunichi Homma, Tokyo (JP)

(73) Assignee: Sony Corporation, Tokyo (JP)

(*) Notice: Subject to any disclaimer, the term of this patent is extended or adjusted under 35 U.S.C. 154(b) by 136 days.

(21) Appl. No.: 13/756,944

(22) Filed: Feb. 1, 2013

(65) Prior Publication Data

US 2013/0202212 A1    Aug. 8, 2013

(30) Foreign Application Priority Data

Feb. 8, 2012    (JP) ................................. 2012-024773

(51) Int. Cl.
| | |
|---|---|
| G06K 9/40 | (2006.01) |
| G06K 9/46 | (2006.01) |
| G06K 9/00 | (2006.01) |
| G06K 9/62 | (2006.01) |
| G06T 7/00 | (2006.01) |

(52) U.S. Cl.
CPC .............. G06K 9/46 (2013.01); G06K 9/00201 (2013.01); G06K 9/6255 (2013.01); G06T 7/0065 (2013.01); G06T 7/0032 (2013.01); G06T 2207/10016 (2013.01); G06T 2207/30244 (2013.01)

(58) Field of Classification Search
USPC ......... 382/100, 107, 153, 124, 115, 181, 190, 382/141, 201, 145, 149, 195, 275; 348/61, 348/79, 333.01, 333.02, 211.2, E13.038, 348/E13.029, E13.071, E13.043, E13.059, 348/E13.031, E13.033, E5.022; 342/81, 90, 342/74, 75; 702/58, 127, 179
See application file for complete search history.

(56) References Cited

U.S. PATENT DOCUMENTS

| | | | | |
|---|---|---|---|---|
| 7,200,260 | B1 * | 4/2007 | Watanabe et al. | 382/153 |
| 7,489,346 | B2 * | 2/2009 | Mizukura et al. | 348/223.1 |
| 8,005,295 | B2 * | 8/2011 | Nobori | 382/162 |
| 8,041,457 | B2 * | 10/2011 | Ohno | 700/259 |
| 8,237,838 | B2 * | 8/2012 | Watanabe | 348/333.02 |
| 8,565,551 | B2 * | 10/2013 | Choi et al. | 382/275 |

FOREIGN PATENT DOCUMENTS

JP        2003-346152        12/2003

\* cited by examiner

Primary Examiner — Sheela Chawan
(74) Attorney, Agent, or Firm — Sony Corporation

(57) ABSTRACT

There is provided an information processing apparatus including an image acquisition unit configured to acquire images captured from a plurality of observation points for a predetermined object, a feature point extraction unit configured to extract a feature point in each of the images acquired by the image acquisition unit, a correspondence relationship acquisition unit configured to acquire a correspondence relationship of the feature points based on images from among adjacent observation points, and an information presentation unit configured to quantitatively present information about the correspondence relationship acquired by the correspondence relationship acquisition unit.

11 Claims, 10 Drawing Sheets

INFORMATION PROCESSING APPARATUS, INFORMATION PROCESSING METHOD, AND COMPUTER PROGRAM

BACKGROUND

The present disclosure relates to an information processing apparatus, an information processing method, and a computer program.

Technology exists in which a robot is made to grasp an object and study the external characteristics of the object so that the robot can recognize it. A widely employed method is to capture an image of the object with an imaging device mounted on the robot and make the robot study the external characteristics of the object based on image data output from the imaging device.

For example, JP 2003-34652A discloses an object recognition apparatus that is configured to moves a recognition target object to a predetermined spatial position determined in advance based on a predetermined imaging unit, hold the object in a predetermined state at that spatial position, recognize the object used on an output from the imaging unit, and if the object could not be recognized, study the object.

SUMMARY

However, although the apparatus described in JP 2003-346152A is configured so that the robot creates an identification device by acquiring an image from each observation point of the target object, detecting the feature points for each observation point, and extracting these feature points, the identification device for each observation point is independent. Further, the apparatus does not consider the relationship among the various feature points that are present. Consequently, with an identification device for each observation point, since the robot studies the object without distinguishing the object feature points from the background feature points, there is the problem that the identification performance can deteriorate due to changes in the surrounding environment.

In addition, since the apparatus described in JP 2003-346152A cannot know the quantity or position of the feature points belonging to an object that can be studied at each observation point, the apparatus cannot learn of the study state at each observation point. Further, the apparatus does not have a correspondence relationship of the feature points among the observation points. Therefore, there is the problem that the apparatus cannot generate and present the user with virtual observation points, or perform interactive processing with the user.

Therefore, according to an embodiment of the present disclosure, provided are a novel and improved information processing apparatus, information processing method, and computer program, capable of visually presenting a study state of an object by using a correspondence relationship among the feature points at each observation point when capturing images of an object from a plurality of observation points and studying that object.

According to an embodiment of the present disclosure, there is provided an information processing apparatus including an image acquisition unit configured to acquire images captured from a plurality of observation points for a predetermined object, a feature point extraction unit configured to extract a feature point in each of the images acquired by the image acquisition unit, a correspondence relationship acquisition unit configured to acquire a correspondence relationship of the feature points based on images from among adjacent observation points, and an information presentation unit configured to quantitatively present information about the correspondence relationship acquired by the correspondence relationship acquisition unit.

According to such a configuration, the image acquisition unit acquires images captured from a plurality of observation points for a predetermined object, and the feature point extraction unit extracts a feature point in each of the images acquired by the image acquisition unit. The correspondence relationship acquisition unit acquires a correspondence relationship of the feature points based on images from among adjacent observation points, and the information presentation unit quantitatively presents information about the correspondence relationship acquired by the correspondence relationship acquisition unit. Consequently, the information processing apparatus can visually present a study state of an object by using a correspondence relationship among the feature points at each observation point when capturing images of an object from a plurality of observation points and studying that object.

Further, according to an embodiment of the present disclosure, there is provided an information processing method including acquiring images captured from a plurality of observation points for a predetermined object, extracting a feature point in each of the images acquired in the image acquisition step, acquiring a correspondence relationship of the feature points based on images from among adjacent observation points, and quantitatively presenting information about the correspondence relationship acquired in the correspondence relationship acquisition step.

Further, according to an embodiment of the present disclosure, there is provided a computer program for causing computer to execute acquiring images captured from a plurality of observation points for a predetermined object, extracting a feature point in each of the images acquired in the image acquisition step, acquiring a correspondence relationship of the features based on images from among adjacent observation points, and quantitatively presenting information about the correspondence relationship acquired in the correspondence relationship acquisition step.

According to an embodiment of the present disclosure described above, provided is a novel and improved information processing apparatus, information processing method, and computer program that are capable of visually presenting a study state of an object by using a correspondence relationship among the feature points at each observation point when capturing images of an object from a plurality of observation points and studying that object.

DETAILED DESCRIPTION OF THE EMBODIMENT(S)

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

The present disclosure will now be described in the following order.
<1. Embodiment of the present disclosure>
[Robot appearance example]
[Robot hardware configuration example]
[Robot function configuration example]
[Robot operation example]
<2. Summary>

1. Embodiment of the Present Disclosure

Robot Appearance Example

Figure 1:
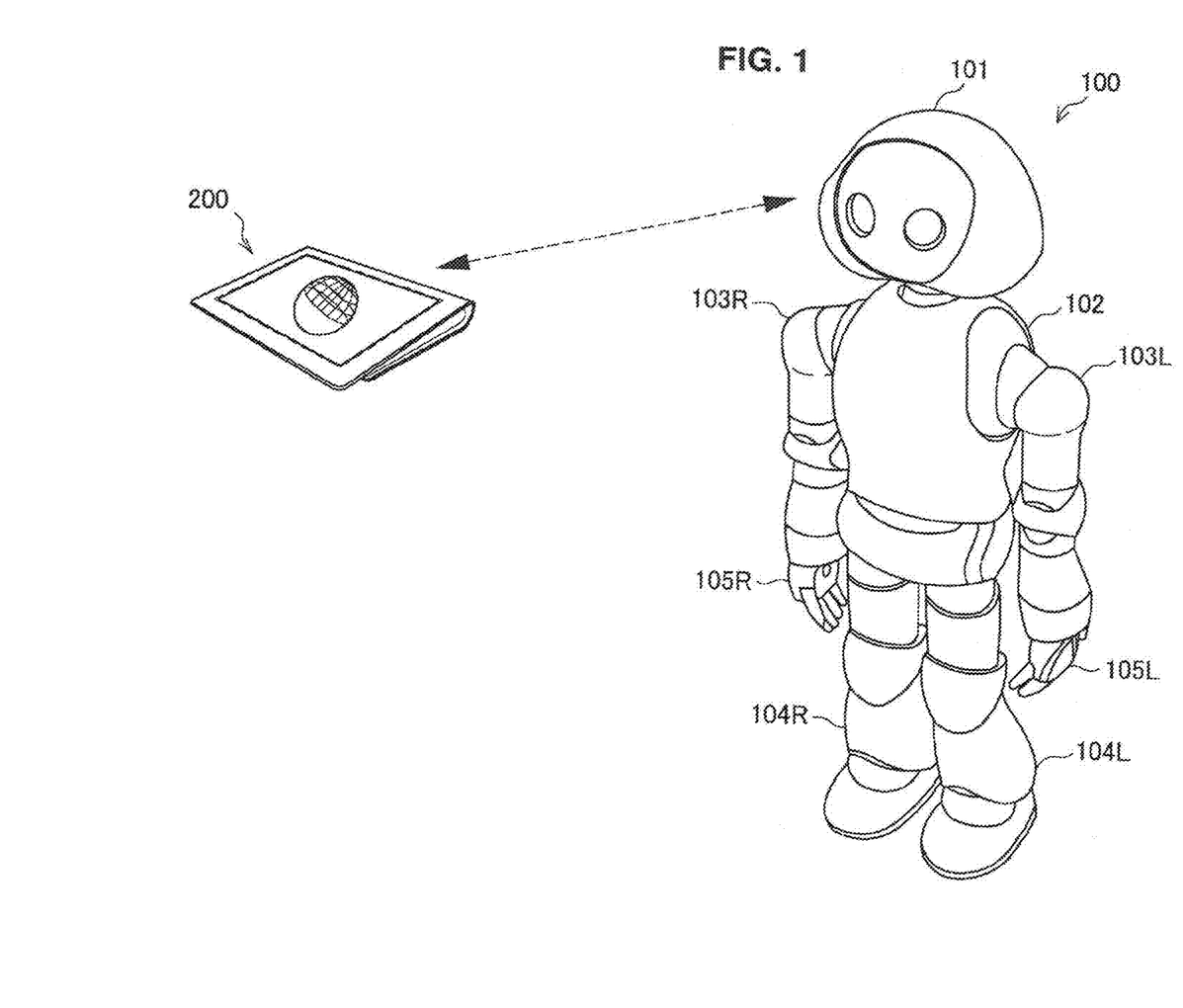
FIG. 1 is an explanatory diagram illustrating an appearance example of a robot according to an embodiment of the present disclosure.

First, the appearance of the robot according to an embodiment of the present disclosure will be described. FIG. 1 is an explanatory diagram illustrating an appearance example of a robot according to an embodiment of the present disclosure. An appearance example of the robot according to an embodiment of the present disclosure will be now described with reference to FIG. 1.

As illustrated in FIG. 1, a robot 100 according to an embodiment of the present disclosure is configured so that a head section 101, a left/right pair of arm sections 103L and 103R, and a left/right pair of leg sections 104L and 104R are attached to a trunk section unit 102 at predetermined positions. Hand sections 105L and 105R are attached to the tip of the arm sections 103L and 103R, respectively. Further, an image input device 121 for obtaining image data is included in the head section 101.

The robot 100 according to an embodiment of the present disclosure is configured to recognize an object grasped by the hand sections 105L and 105R by capturing images of the object with the input device 121, and if that object cannot be recognized, study the object by capturing images of the object grasped by the hand sections 105L and 105R from a plurality of directions.

In addition to the robot 100, FIG. 1 also illustrates an information processing apparatus 200 that executes control of the robot 100. The information processing apparatus 200 is configured so that it can instruct the robot 100 to study an object, and display the content studied by the robot 100.

An appearance example of the robot according to an embodiment of the present disclosure was described above with reference to FIG. 1. Next, a hardware configuration example of a robot according to an embodiment of the present disclosure will be described.

Robot Hardware Configuration Example

Figure 2:
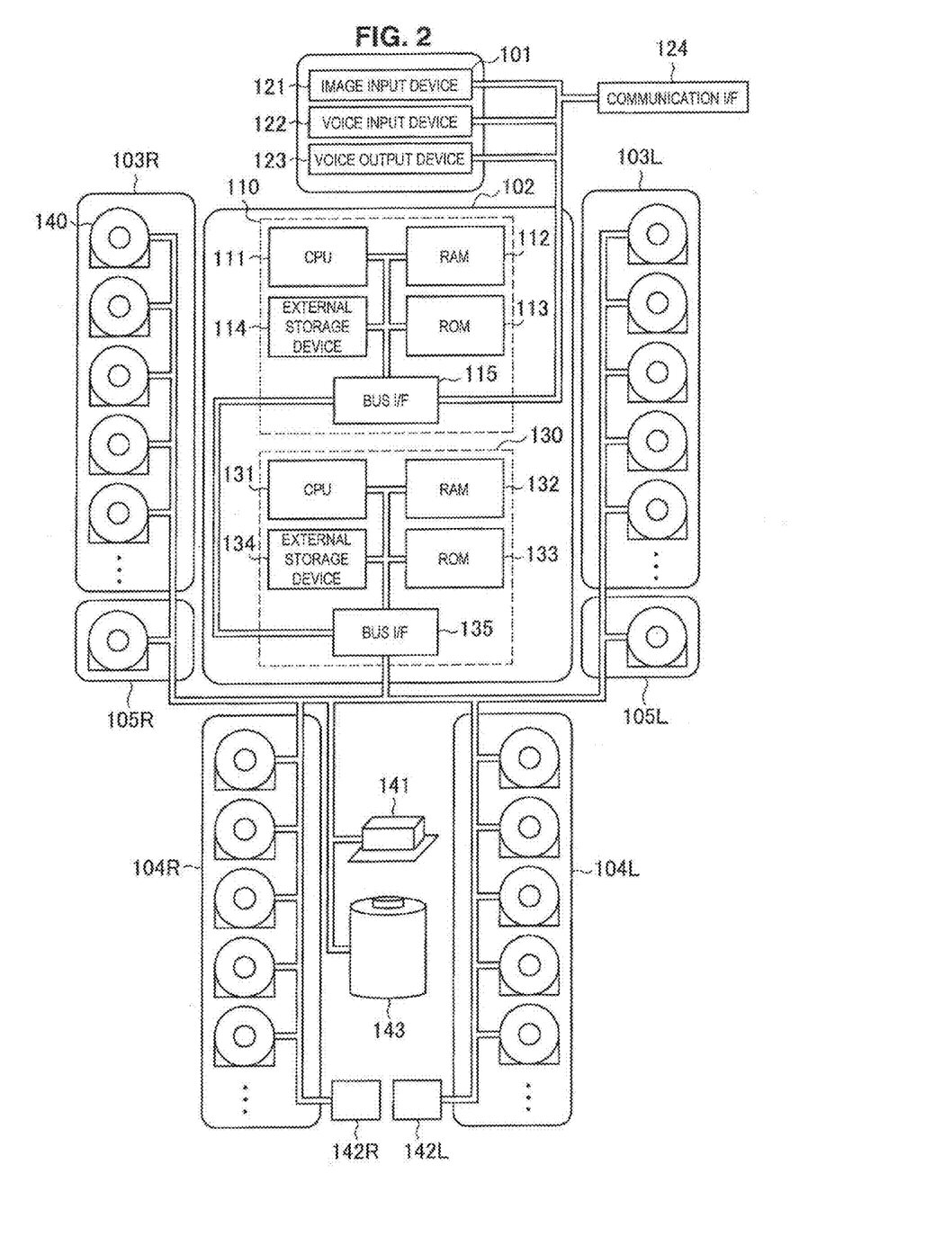
FIG. 2 is an explanatory diagram illustrating a hardware configuration example of a robot 100 according to an embodiment of the present disclosure.

FIG. 2 is an explanatory diagram illustrating a hardware configuration example of the robot 100 according to an embodiment of the present disclosure. A hardware configuration example of the robot 100 according to an embodiment of the present disclosure will now be described with reference to FIG. 2.

As illustrated in FIG. 2, the robot 100 according to an embodiment of the present disclosure has a control system in the trunk section unit 102, for example. The control system is configured from a thought control module 110, which dynamically responds to user inputs and the like to carry out information determinations and emotion expressions, and a movement control module 130, which controls total body coordinated movement of the robot 100 by driving an actuator 140, for example.

The thought control module 110 is configured from, for example, a CPU 111, which executes calculation processing relating to information determinations and emotion expressions, a RAM 112, a ROM 113, and an external storage device 114. The thought control module 110 determines the current emotions and intentions of the robot 100 based on external stimuli, such as image data input from an image input device 121, voice data input from a voice input device 122, and commands input from a communication IF 124. The thought control module 110 transmits commands to the movement control module 130 so as to execute operations and actions based on thought determinations.

The movement control module 130 is configured from, for example, a CPU 131, which controls total body coordinated movement of the robot 100, a RAM 132, a ROM 133, and an external storage device 134. The external storage device 134 stores, for example, walk patterns, target ZMP (zero moment point) trajectories, and other operation patterns, which have been calculated online.

The movement control module 130 is connected via a bus interface (IF) to various devices, such as actuators 140, a distance measurement sensor (not illustrated), an orientation sensor 141, grounding confirmation sensors 142L and 142R, a load sensor (not illustrated), and a power source control device 143. The actuators 140 are used to realize the movements of the various joint portions of the robot 100. The orientation sensor 141 is used to measure the orientation and the tilt of the robot 100. The grounding confirmation sensors 142L and 142R are used to detect whether the soles of the left and right feet are separated from or touching the floor. The load sensor is used to detect the load acting on the soles of the left and right feet. The power source control device 143 is used to manage power from a battery or the like.

The thought control module 110 and the movement control module 130 are built on a common platform, and are connected to each other via bus interfaces (IF) 115 and 135.

The movement control module 130 controls the total body coordinated movement with the various actuators 140 so as to execute the actions instructed from the thought control module 110. The CPU 131 reads from the external storage device 134 an operation pattern based on the actions instructed from the thought control module 110, or generates an operation pattern internally. Further, the CPU 131 sets leg section movement, a ZMP trajectory, trunk movement, upper limb movement, lumbar horizontal position and height and the like, based on a specified pattern, and transmits to the respective actuators 140 commands that instruct an operation based on the set content.

Further, the CPU 131 adaptively controls the total body coordinated movement of the robot 100 by detecting the orientation and the tilt of the trunk section unit 102 of the robot 100 based on an output signal from the orientation sensor 141, and detecting whether each of the leg sections 104L and 104R is a free leg or a grounded leg based on an output signal from the grounding confirmation sensors 142L and 142R. In addition, the CPU 131 controls the orientation and the tilt of the robot 100 so that the ZMP position is constantly in the center of a ZMP stable region.

The movement control module 130 provides feedback to the thought control module 110 about how much of an intended action determined by the robot 100 has been realized, i.e., the processing state. Thus, the robot 100 can autonomously act by determining the state of itself and its surroundings based on a control program.

A hardware configuration example of the robot 100 according to an embodiment of the present disclosure was described above with reference to FIG. 2. Next, a hardware configuration example of the robot 100 according to an embodiment of the present disclosure will be described.

Robot Function Configuration Example

Figure 3:
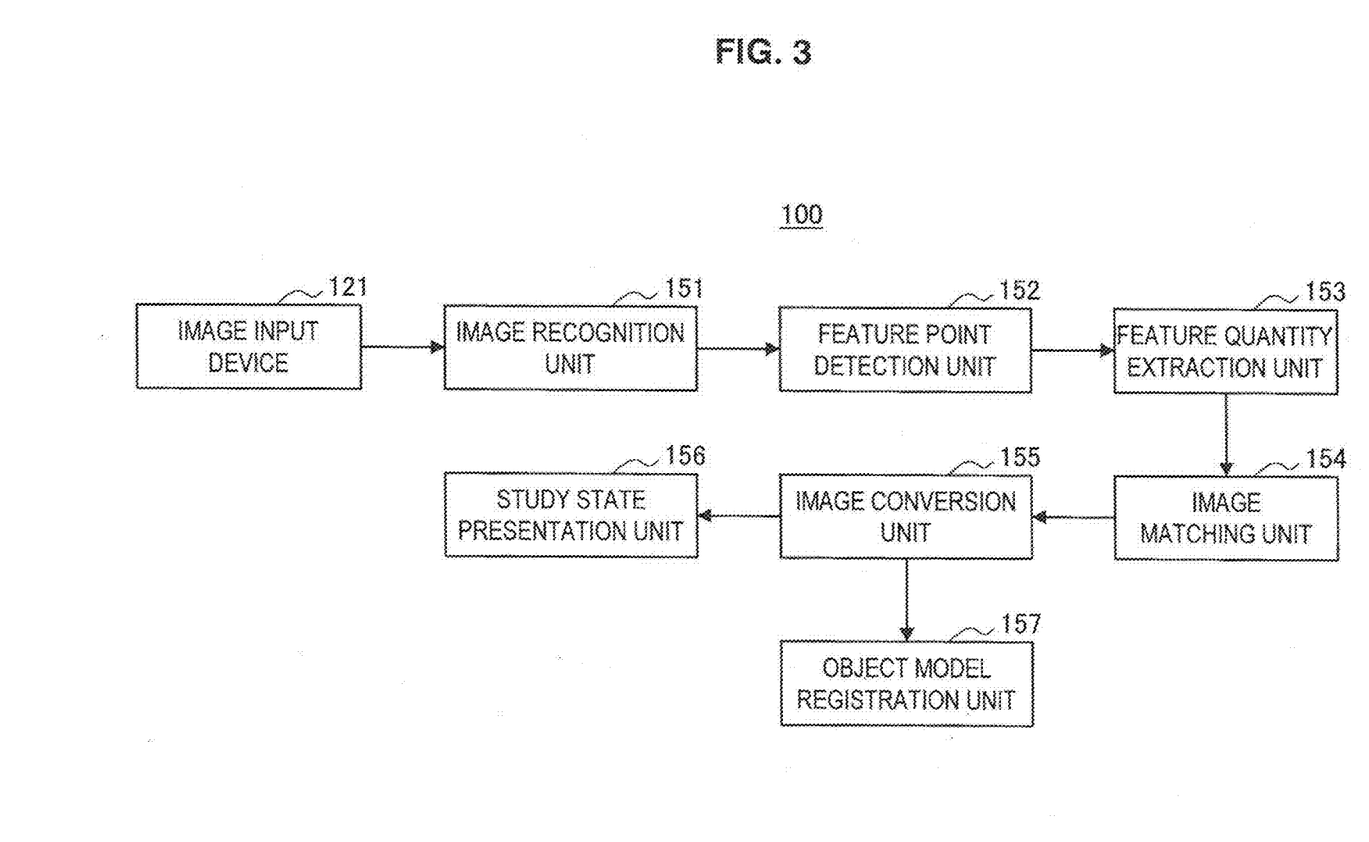
FIG. 3 is an explanatory diagram illustrating a function configuration example of a robot 100 according to an embodiment of the present disclosure.

FIG. 3 is an explanatory diagram illustrating a function configuration example of a robot 100 according to an embodiment of the present disclosure. The robot 100 function configuration illustrated in FIG. 3 is a configuration for a case in which an object captured by the image input device 121 is studied. A function configuration example of a robot 100 according to an embodiment of the present disclosure will now be described with reference to FIG. 3.

As illustrated in FIG. 3, the robot 100 according to an embodiment of the present disclosure is configured from an image recognition unit 151, a feature detection unit 152, a feature quantity extraction unit 153, an image matching unit 154, an image conversion unit 155, a study state presentation unit 156, and an object model registration unit 157.

The image recognition unit 151 performs recognition of the object to be studied based on an image captured by the image input device 121. If the image recognition unit 151 recognizes the object to be studied based on an image captured by the image input device 121, the image recognition unit 151 transmits the image captured by the image input device 121 to the feature detection unit 152.

The feature detection unit 152 detects feature points from the image captured by the image input device 121. The feature points are detected by, for example, searching an image pattern corresponding to a characteristic site, such as a corner portion of the object captured by the image input device 121. When a feature point is detected from the image captured by the image input device 121, the feature detection unit 152 transmits the image and information about the feature point to the feature quantity extraction unit 153.

The feature quantity extraction unit 153 extracts a feature quantity of the feature point from the image captured by the image input device 121 and the information about the feature point included in that image, which are sent from the feature detection unit 152. There are various methods for detecting the feature quantity. However, the present disclosure is not limited to a specific method. One example is for the feature quantity extraction unit 153 to extract information about the pixels at a position corresponding to the feature point as the feature quantity (local feature quantity). When the feature quantity of the feature point has been extracted, the feature quantity extraction unit 153 transmits the information about the feature point and the information about the feature quantity to the image matching unit 154.

The image matching unit 154 performs feature point matching using the information about the feature quantity between an image captured by the robot 100 with the image input device 121 at a predetermined observation point and the images captured with the image input device 121 at observation points around that observation point, and determines candidates thought to have a matching feature point. The image matching unit 154 transmits information about the candidates thought to have a matching feature point to the image conversion unit 155.

The image conversion unit 155 performs image conversion processing using the information about the candidates thought to have a matching feature point transmitted from the image matching unit 154. Specifically, the image conversion unit 155 determines a plane conversion between pairs of matching feature points using the information about the candidates thought to have a matching feature point. The image conversion unit 155 may also determine the plane conversion by applying RANSAC (RANdom SAmple Consensus) on the information about the candidates thought to have a matching feature point that is transmitted from the image matching unit 154, and then remove outlier pairs. When the plane conversion between pairs of matching feature points is determined, the image conversion unit 155 transmits the determined plane conversion along with information about the matching feature point and the feature point pairs to the study state presentation unit 156 and the object model registration unit 157.

The study state presentation unit 156 presents a study state of the object to be studied performed by the robot 100. The study state of the object to be studied is presented using the plane conversion between pairs of matching feature points and the information about the matching feature points and the feature point pairs. The study state of the object to be studied is displayed on a personal computer, a tablet, a smartphone, or some other information processing apparatus connected by a network to the robot 100, for example.

The object model registration unit 157 registers the plane conversion between pairs of matching feature points, the information about the matching feature points and the feature point pairs, information about the respective observation points, and information about between the observation points as an object model for each observation point. By building an object model for each observation point with the object model registration unit 157, the robot 100 recognizes the common parts among the plurality of object models, merges them, and studies the result as a target object model.

A function configuration example of the robot 100 according to an embodiment of the present disclosure was described above with reference to FIG. 3. Next, operation of the robot 100 according to an embodiment of the present disclosure will be described.

Robot Operation Example

Figure 4:
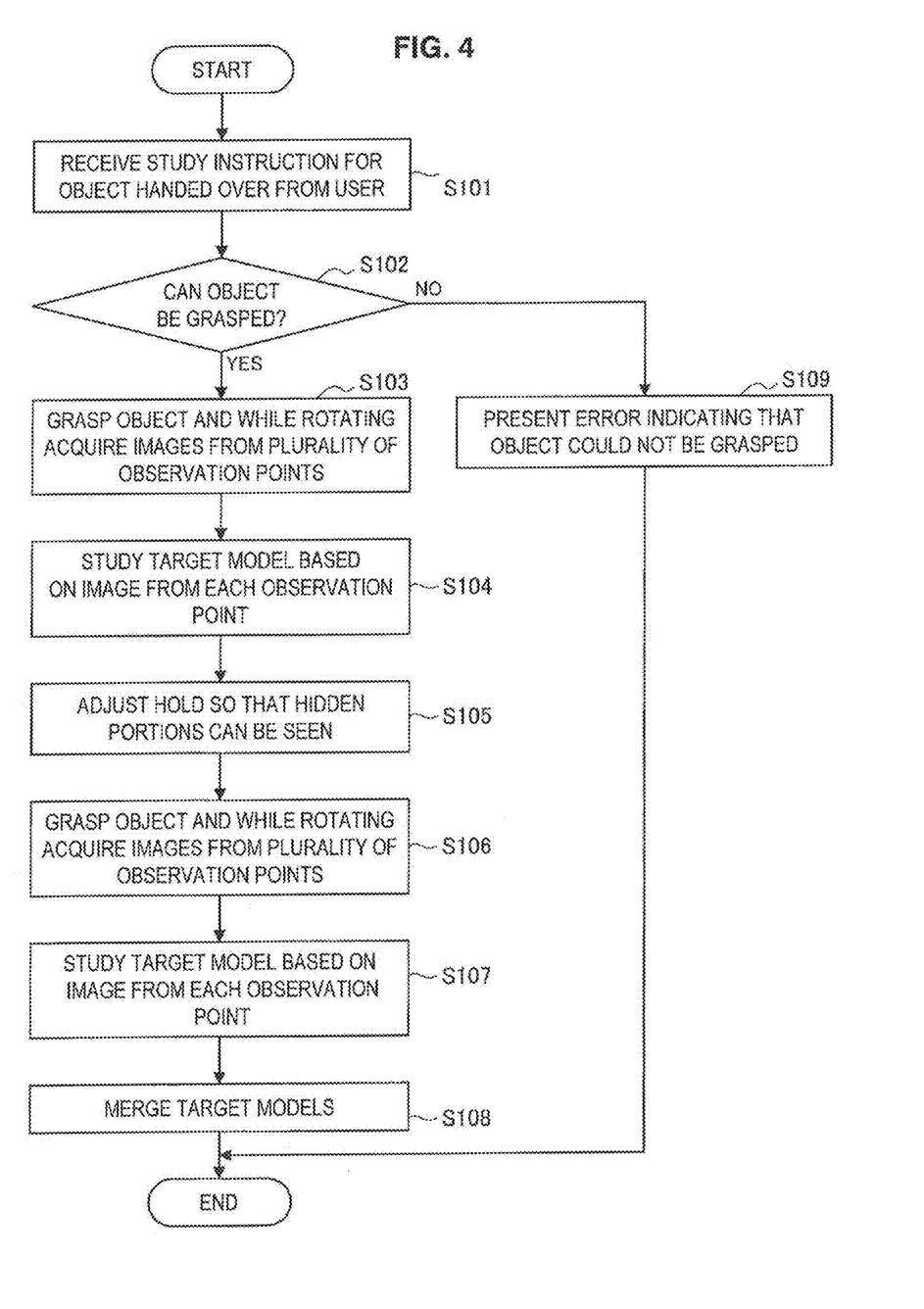
FIG. 4 is a flowchart illustrating operation of a robot 100 according to an embodiment of the present disclosure.

FIG. 4 is a flowchart illustrating operation of a robot 100 according to an embodiment of the present disclosure. The flow illustrated in FIG. 4 illustrates a case in which the robot 100 studies an object based on a user instruction. Operation of the robot 100 according to an embodiment of the present disclosure will now be described with reference to FIG. 4.

When an object is handed over from the user and the robot 100 receives a study instruction for that object (step S101), first, the robot 100 determines whether the object can be grasped by the hand sections 105L, and 105R (step S102).

If it is determined in step S102 that the object handed over from the user can be grasped by the hand sections 105L and 105R, the robot 100 grasps the object with the hand sections 105L and 105R, and while rotating the grasped object, captures images from a plurality of observation points with the image input device 121 (step S103). The robot 100 captures the images with the image input device 121 at predetermined intervals, such as in five degree units in the horizontal angle direction or five degree units in the zenith angle direction. The robot 100 may also change the image capture interval for the image input device 121 based on the shape of the object. For example, the robot 100 may capture the images with the image input device 121 at a narrower interval.

After the robot 100 has captured the images from a plurality of observation points of the grasped object with the image input device 121 in step S103, the robot 100 then studies models of the grasped object based on the images from each observation point (step S104). How the robot 100 studies the models of the grasped object will be described in detail below.

After the robot 100 has studied a model of the grasped object based on the images from each observation point in step S104, the robot 100 then adjusts its hold of the grasped object so that the portions hidden by the hand sections 105L and 105R of the grasped object can be seen. This adjustment of how the object is held can be executed by the robot 100 making a determination by itself, or executed based on an instruction from the user.

After the robot 100 has adjusted its hold of the grasped object in step S105, similar to step S103, the robot 100 grasps the object with the hand sections 105L and 105R, and while rotating the grasped object, captures images from a plurality of observation points with the image input device 121 (step S106). After the robot 100 has captured images of the grasped object from a plurality of observation points with the image input device 121 in step S106, the robot 100 then studies models of the grasped object based on the images from each observation point (step S107).

When the robot 100 has finished capturing images of the grasped object from all observation points, the robot 100 recognizes the common parts in the object models from each observation point, merges the object models from each observation point, and studies the result as a model of the target object (step S108).

On the other hand, if it is determined in step S102 that the object handed over from the user cannot be grasped by the hand sections 105L and 105R, the robot 100 presents an error message indicating that the object cannot be grasped on a predetermined device (step S109). Examples of the method for presenting the error message may include, although are not specifically limited to, displaying an error message on a display device included in the robot 100, and communicating from the robot 100 to an information processing apparatus the fact that the object cannot be grasped and displaying an error message on the information processing apparatus.

By executing this series of operations, the robot 100 can study an unknown object grasped by the hand sections 105L and 105R based on a user instruction.

Operation of the robot 100 according to an embodiment of the present disclosure was described above with reference to FIG. 4. Next, a separate example of a method for studying an unknown object with the robot 100 will be described.

Figure 5:
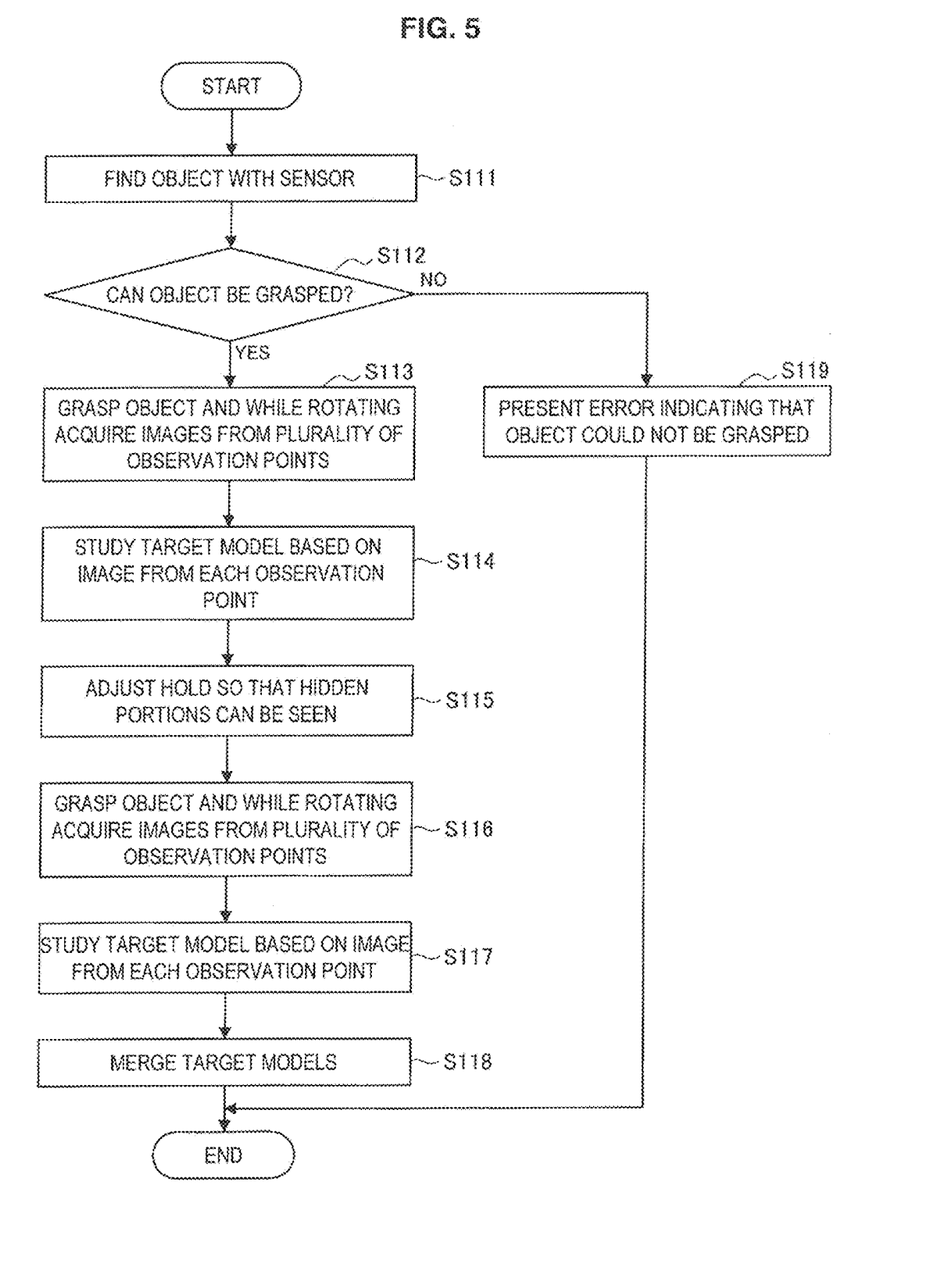
FIG. 5 is a flowchart illustrating operation of a robot 100 according to an embodiment of the present disclosure.

FIG. 5 is a flowchart illustrating operation of a robot 100 according to an embodiment of the present disclosure. The flow illustrated in FIG. 5 illustrates a case in which the robot 100 finds an unknown object by itself and studies that unknown object. Operation of the robot 100 according to an embodiment of the present disclosure will now be described with reference to FIG. 5.

When the robot 100 finds an object using, for example, a sensor such as a laser rangefinder (LRF) or the like (step S111), first, the robot 100 determines whether the found object can be grasped by the hand sections 105L and 105R (step S112).

If it is determined in step S112 that the object handed over from the user can be grasped by the hand sections 105L and 105R, the robot 100 grasps the object with the hand sections 105L and 105R, and while rotating the grasped object, captures images from a plurality of observation points with the image input device 121 (step S113). The robot 100 captures the images with the image input device 121 at predetermined intervals, such as in five degree units in the horizontal angle direction or five degree units in the zenith angle direction. Obviously, the image capture interval of images of the object by the robot 100 is not limited to this example.

After the robot 100 has captured the images from a plurality of observation points of the grasped object with the image input device 121 in step S113, the robot 100 then studies models of the grasped object based on the images from each observation point (step S114). How the robot 100 studies the models of the grasped object will be described in detail below.

After the robot 100 has studied a model of the grasped object based on the images from each observation point in step S114, the robot 100 then adjusts its hold of the grasped object so that the portions hidden by the hand sections 105L and 105R of the grasped object can be seen. This adjustment of how the object is held can be executed by the robot 100 making a determination by itself, or executed based on an instruction from the user.

After the robot 100 has adjusted its hold of the grasped object in step S115, similar to step S113, the robot 100 grasps the object with the hand sections 105L and 105R, and while rotating the grasped object, captures images from a plurality of observation points with the image input device 121 (step S116). After the robot 100 has captured images of the grasped object from a plurality of observation points with the image input device 121 in step S116, the robot 100 then studies models of the grasped object based on the images from each observation point (step S117).

When the robot 100 has finished capturing images of the grasped object from all observation points, the robot 100 recognizes the common parts in the object models from each observation point, merges the object models from each observation point, and studies the result as a model of the target object (step S118).

On the other hand, if it is determined in step S112 that the object handed over from the user cannot be grasped by the hand sections 105L and 105R, the robot 100 presents an error message indicating that the object cannot be grasped on a predetermined device (step S119). Examples of the method for presenting the error message may include, although are not specifically limited to, displaying an error message on a display device included in the robot 100, and communicating from the robot 100 to an information processing apparatus the fact that the object cannot be grasped and displaying an error message on the information processing apparatus.

A separate example of a method for studying an unknown object with the robot 100 as an operation of the robot 100 according to an embodiment of the present disclosure was described above with reference to FIG. 5. Next, a method for building a model, which has an observation point structure, of the object to be studied by the robot 100 will be described.

Figure 6:
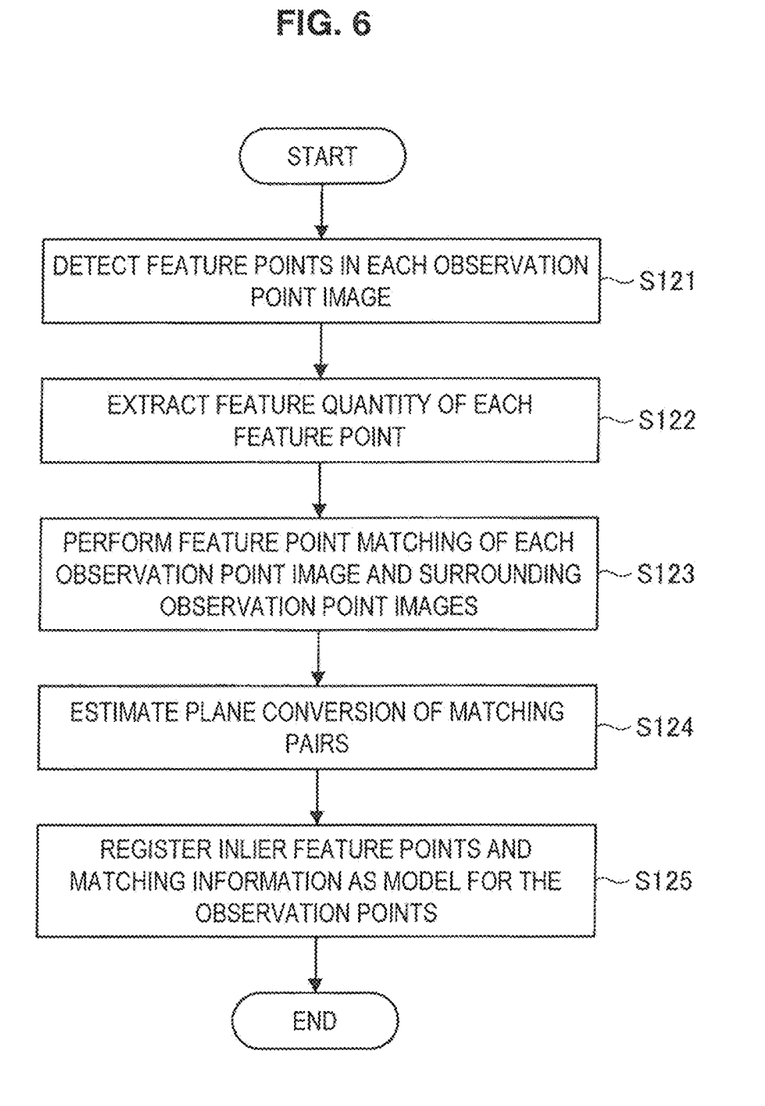
FIG. 6 is a flowchart illustrating operation of a robot 100 according to an embodiment of the present disclosure.

FIG. 6 is a flowchart illustrating operation of a robot 100 according to an embodiment of the present disclosure. The flowchart illustrated in FIG. 6 illustrates a method for building a model, which has an observation point structure, of the object to be studied by the robot 100. Operation of the robot 100 according to an embodiment of the present disclosure will now be described with reference to FIG. 6.

After the robot 100 has captured images from a plurality of observation points with the image input device 121, the robot 100 recognizes with the image recognition unit 151 that the object to be studied is included in the thus-captured plurality of images. Then, the robot 100 detects the feature points in each image (step S121). Feature point detection is executed by the feature detection unit 152.

After the feature points in each image have been detected in step S121, the robot 100 then performs feature quantity extraction of the feature points obtained in step S121 (step S122). Feature quantity extraction is executed by the feature quantity extraction unit 153.

After the feature quantity of the feature points included in each image has been extracted in step S122, the robot 100 matches the feature points obtained at each observation point with the feature points in images from surrounding observation points (step S123). This feature point matching is executed by the image matching unit 154.

After then the feature points obtained at each observation point have been matched with the features in the images from surrounding observation points in step S123, the robot 100 then applies RANSAC, for example, on the candidates of matching point pairs determined by the matching operation, removes outlier pairs, and determines a plane conversion between pairs of matching points (homography) (step S124). The plane conversion between the pairs of matching points is determined by the image conversion unit 155.

Figure 7:
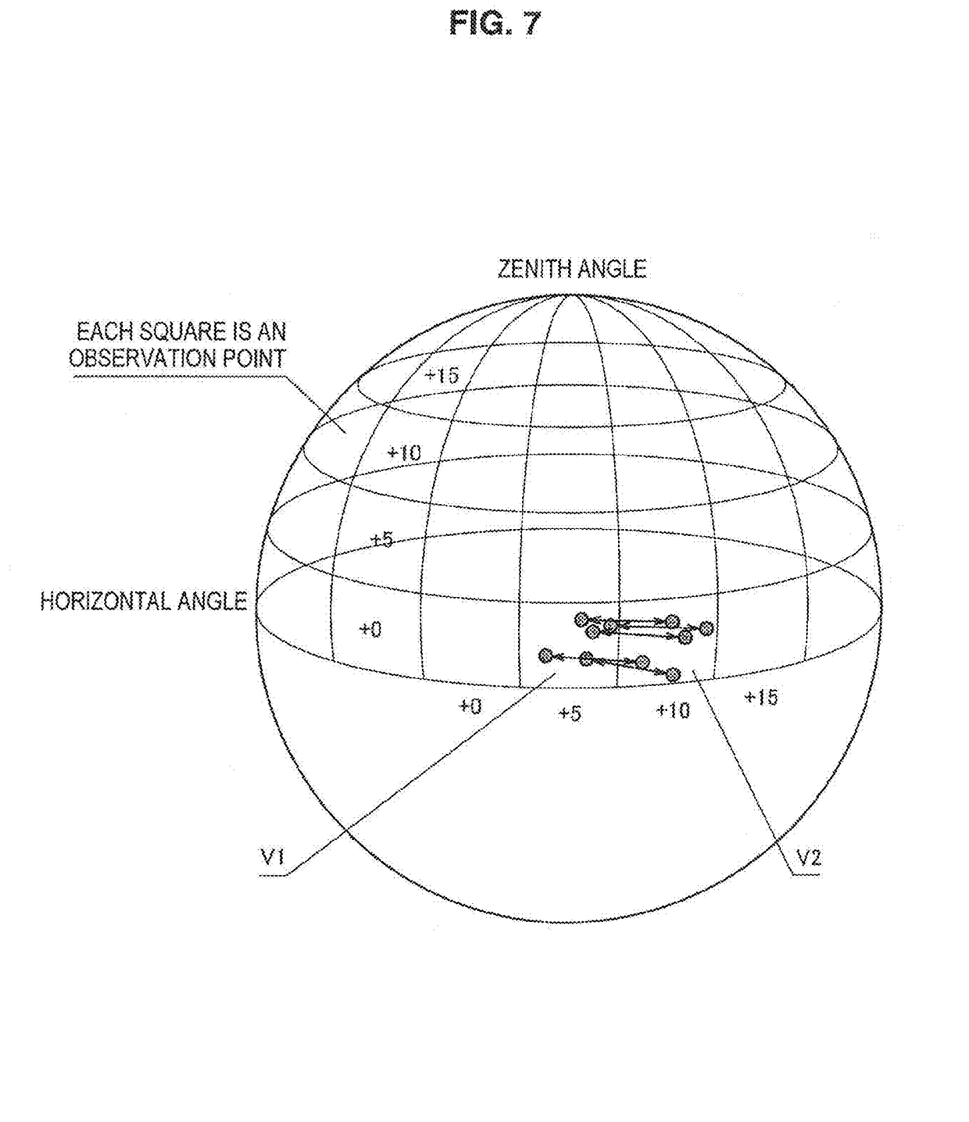
FIG. 7 is an explanatory diagram illustrating a concept of link information between inlier feature points and matching points of adjacent observation points.

FIG. 7 is an explanatory diagram illustrating a concept of link information between inlier feature points and matching points of adjacent observation points. In FIG. 7, link information between inlier feature points and matching points at observation points V1 and V2 is illustrated. Such link information between inlier feature points and matching points is generated between adjacent observation points for all observation points.

After the plane conversion between the pairs of matching points has been performed in step S124, the robot 100 registers both matching points that match between an observation point, the link information about between the matching points, and the plane conversion between the pairs of matching points in the object model as the respective observation points and the inter-observation point information (step S125). Registration in the object model is executed by the object model registration unit 157. The robot 100 executes this series of operations for all observation points.

By executing the operations illustrated in FIG. 6, the robot 100 can register an of model for an unknown object based on images from a plurality of observation points captured with the image input device 121. Further, the robot 100 can present on the information processing apparatus 200, for example, the study state of the object model obtainable based on the images from a plurality of observation points captured with, the image input device 121.

A method for building a model, which has an observation point structure, of an object to be studied by the robot 100 was described above. Next, an example of a GUI (graphical user interface) for confirming a study state of the object model of the robot 100 will be described.

Figure 8:
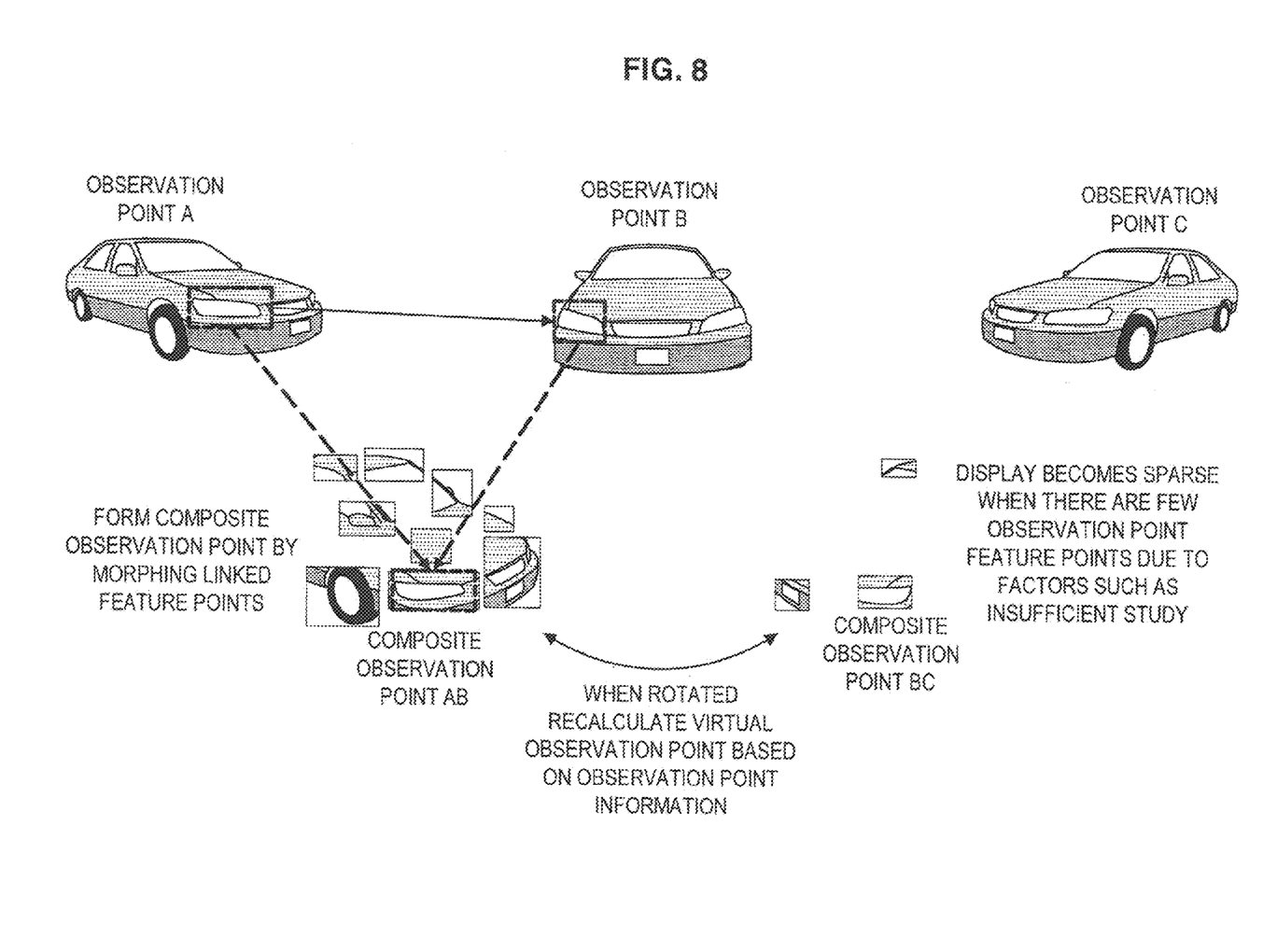
FIG. 8 is an explanatory diagram illustrating an example of a GUI for a user to confirm a study state of an object model of a robot 100.

FIG. 8 is an explanatory diagram illustrating an example of a GUI for a user to confirm a study state of an object model of the robot 100. The GUI for confirming a study state of the object model of the robot 100 may be, for example, generated by the study state presentation unit 156, and transmitted to the information processing apparatus 200, or the information processing apparatus 200 can obtain the information relating to the study state from the robot 100 and generate the GUI by itself. An example of a GUI for a user to confirm a study state of an object model of the robot 100 will now be described with reference to FIG. 8.

On the GUI illustrated in FIG. 8, a local image of a feature point that has been studied at the observation point currently presented to the user is displayed at a position corresponding to that object model. If a real observation point is present in the object model (the observation point acquired as the study image), the currently displayed observation point is presented based on the information for that observation point.

On the other hand, if the currently displayed observation point is not present in the object model, based on the feature points at nearby adjacent actual observation points and local images thereof, link information about the feature points between observation points, and the plane conversion (homography), a virtual observation point is generated by performing predetermined image processing (e g, morphing etc.), and a virtual observation point image is presented.

The user can rotate the object, which was generated by the study state presentation unit 156 and drawn based on the local image, by using a touch panel, for example. After rotation by the user, the position of the feature point and the local image at the observation point after rotation of the object model are called up. For a virtual observation point, suitable image processing (e.g., morphing etc) is performed, and the result is presented to the user.

Presenting the study state of the robot 100 with a GUI like that illustrated in FIG. 8 enables the user to determine from which observation points the study state is sufficient and from which observation points the study state is insufficient. Further, the user can also specify a predetermined observation point for which study is insufficient, and instruct the robot 100 to restudy that observation point. The robot 100 that has received this instruction can achieve a sufficient level of study by capturing an image of the object at that observation point and surrounding observation points to execute restudy.

For example, in the example illustrated in FIG. 8, regarding a composite observation point AB between observation point A and observation point B, since the virtual observation point image of the object is sufficiently produced, the display is detailed. However, regarding a composite observation point BC between observation point B and observation point C, since the virtual observation point image of the object is not sufficiently produced, the display is sparse. When a virtual observation point image is thus displayed, since study at observation point C is insufficient, the user can instruct the robot 100 to restudy observation point C. When the robot 100 is instructed by the user to restudy observation point C, the robot 100 executes restudy by capturing images of the object at observation point C and observation points surrounding observation point C.

An example of a GUI for a user to confirm a study state of an object model of the robot 100 was described above with reference to FIG. 8. Next, an example of registration processing of an object name and a category name for an object model studied by the robot 100 will be described.

Figure 9:
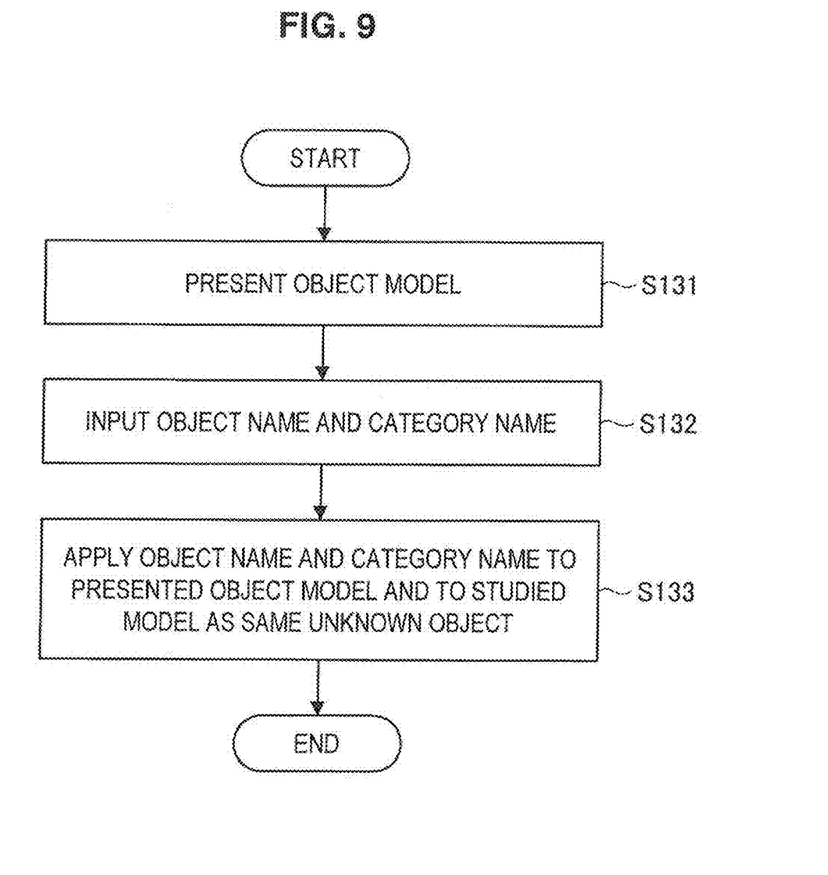
FIG. 9 is a flowchart illustrating an example of registration processing of an object name and a category name for an object model studied by a robot 100.

FIG. 9 is a flowchart illustrating an example of registration processing of an object name and a category name for an object model studied by a robot 100. An example of registration processing of an object name and a category name for an object model studied by a robot 100 will now be described with reference to FIG. 9.

For example, the user gives a name to the object name and a category name of an object model that is presented using the GUI illustrated in FIG. 8. First, the robot 100 presents an object model obtained by studying an unknown object on a GUI like that illustrated in FIG. 8, for example (step S131).

The user inputs the object name of the object model presented in step S131 and the category name that this object belongs to (step S132).

After the user has input the object name and category name in step S132, the robot 100 applies that object name and category name to the object model presented in step S131 and to the models that were studied as an identical unknown object (step S133).

By registering the object name and category name for an object model studied by the robot 100 based on such a flow, when studying an unknown object that has a similar shape to that of an object whose object name and category name have already been registered, the robot 100 can acquire the object name and category name of that unknown object from the object name and category name registered for a similarly shaped object, and present that information to the user.

An example of registration processing of an object name and a category name for an object model studied by the robot 100 was described above with reference to FIG. 9. Next, a separate example of a GUI confirming a study state of an object model of a robot 100 will be described.

Figure 10:
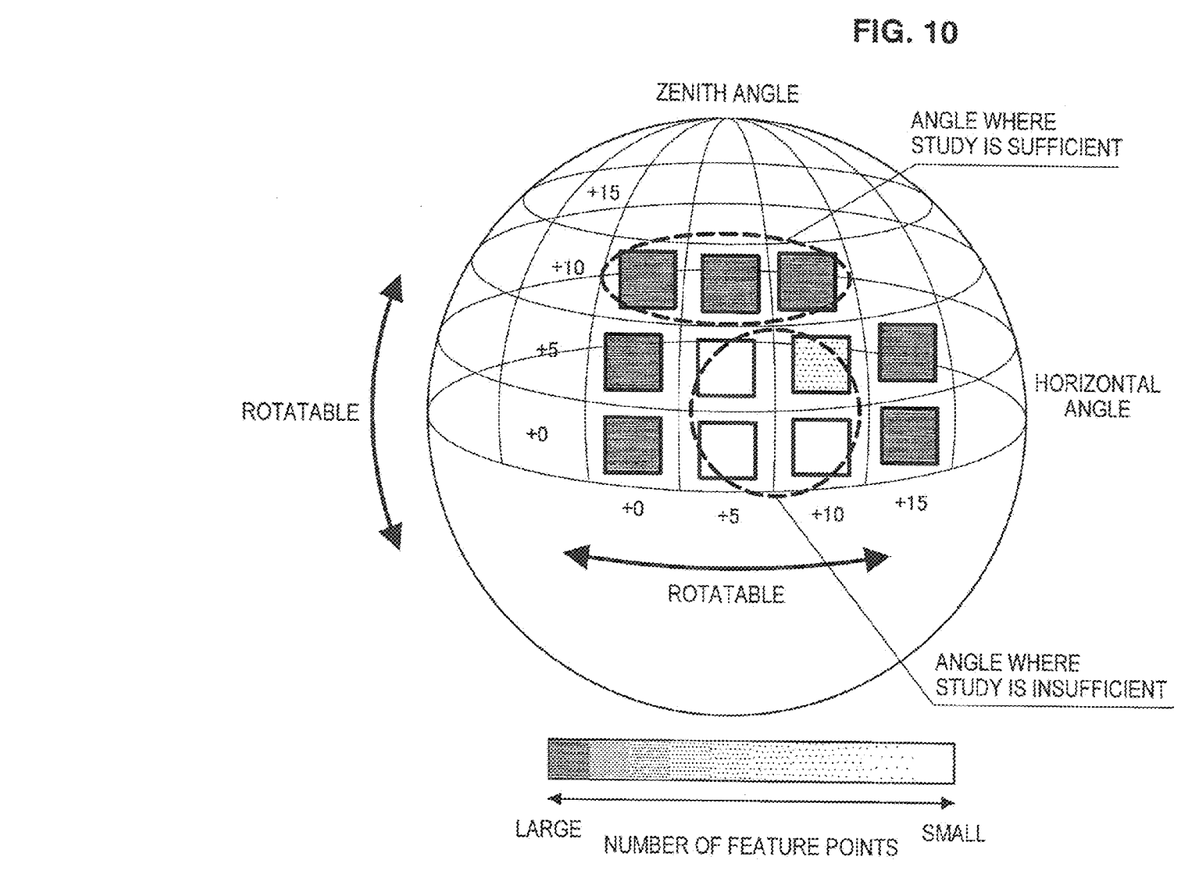
FIG. 10 is an explanatory diagram illustrating an example of a GUI for a user to confirm a study state of an object model of a robot 100.

FIG. 10 is an explanatory diagram illustrating a separate example of a GUI for confirming a study state of an object model of a robot 100. A separate example of a GUI confirming a study state of an object model of the robot 100 will now be described with reference to FIG. 10.

The GUI illustrated in FIG. 10 illustrates art example that displays a study state in graphical form projected on a spherical surface, which is displayed as a spherical surface having a horizontal angle and a zenith angle measure in which the observation points for the object are equidistant to each other. Each observation point is represented as a grid formed by dividing the spherical surface into horizontal angles and zenith angles corresponding thereto.

The GUI illustrated in FIG. 10 changes, based on the number of feature points that have a link to a feature point from a surrounding observation point of the studied model at each observation point, the color of the grid corresponding to that observation point. The user can optionally rotate the spherical surface using a touch panel, for example. Consequently, the user can confirm an observation point that has few feature points, and instruct the robot 100 to perform additional study using a touch panel, for example. Although in FIG. 10 the color of a grid corresponding to an observation point was changed based on the number of feature points that have a link to a feature point from a surrounding observation point, alternatively; the GUI may also be configured so that the grayscale or contrast of the color of the grid corresponding to that observation point is changed based on the number of feature points.

Obviously, the GUI for confirming a study state of an object model of the robot 100 is not limited to this example. For example, link information about the feature points as illustrated in FIG. 7 may be superimposed over the spherical surface displayed in FIG. 10. As another example, an actual image of the object as illustrated in FIG. 8 and an image based on a virtual observation point may be displayed together when displaying a study state of the object model of the robot 100 on a spherical surface like that illustrated in FIG. 10.

When the study state of the object model of the robot 100 is illustrated in that manner, the spherical surface may be rotated in conjunction with a rotation operation of the object by the user, or the object may be rotated in conjunction with a rotation operation of the spherical surface by the user. Thus, presenting a study state of the object model of the robot 100 enables the user to visually confirm from which observation points of the object the study state is sufficient and from which observation points of the object the study state is insufficient, which makes it easier to instruct the robot 100 to restudy the observation points where study is insufficient.

Further, for example, the GUI for confirming a study state of an object model of the robot 100 may be configured so as to present a feature point that no links are attached to at any of the observation points. Even if the robot 100 determines that a feature point has no links attached to it, in actual practice that feature point may be the same feature point as that of an image from a surrounding observation point. In such a case, the fact that a feature point presented as having no links attached to it is a feature point that does have a link attached to it can be input by the user into the GUI.

Conversely, even if the robot 100 determines that a feature point has links attached to it, in actual practice that feature point may not be the same feature point as that of an image from a surrounding observation point. In such a case, the fact that a feature point presented as having links attached to it is a feature point that does not have a link attached to it can be input by the user into the GUI.

SUMMARY

According to the above-described embodiment of the present disclosure, a study state of an object model studied by the robot 100 can be visually presented. Visually presenting the study state of an object model studied by the robot 100 enables the user to determine whether the robot 100 may need to restudy the object.

It should be understood by those skilled in the art that various modifications, combinations, sub-combinations and alterations may occur depending on design requirements and other factors insofar as they are within the scope of the appended claims or the equivalents thereof.

For example, in the above-described embodiment of the present disclosure, the object is grasped by the robot 100, and the grasped object is studied. However, the present disclosure is not limited to this. For example, the robot 100 may capture images of the object while moving around the periphery of the object to be studied. Moreover, for example, in the above-described embodiment of the present disclosure, the object was handed over from the user, and when the object could not be grasped by the hand sections 105L and 105R because it is too large, its shape is deformed or the like, the robot 100 is configured so that an error message indicating that the object could not be grasped was presented by a predetermined unit. However, the present disclosure is not limited, to this. The robot 100 may be configured so that if the object handed over from the user cannot be grasped by the hand sections 105L and 105R because it is too large, its shape is deformed or the like, the robot 100 moves by itself to the vicinity of the object that is placed on the floor surface, acquires images of the object from a plurality of observation points, and studies the object based on the acquired images.

Further, for example, although in the above-described embodiment of the present disclosure, study of the object was performed by the robot 100, the present disclosure is not limited to this example. For example, images of the object captured by the image input device 121 in the robot 100 can be constantly transmitted to a server apparatus connected to the robot 100 via a network, and the study of the object captured by the robot 100 can be executed by the server.

Additionally, the present technology may also be configured as below.

(1) An information processing apparatus including:
an image acquisition unit configured to acquire images captured from a plurality of observation points for a predetermined object;
a feature point extraction unit configured to extract a feature point in each of the images acquired by the image acquisition unit;
a correspondence relationship acquisition unit configured to acquire a correspondence relationship of the feature points based on images from among adjacent observation points; and
an information presentation unit configured to quantitatively present information about the correspondence relationship acquired by the correspondence relationship acquisition unit, (2) The information processing apparatus according to (1), wherein the information presentation unit is configured to quantitatively present information about the correspondence relationship between a predetermined observation point and an observation point adjacent to that observation point.

(3) The information processing apparatus according to (2), wherein the information presentation unit is configured to present a line that links the feature points as the information about the correspondence relationship.

(4) The information processing apparatus according to (2) or (3), wherein the information presentation unit is configured to virtually generate and present an image from an observation point between the predetermined observation point and the observation point adjacent to that observation point as the information about the correspondence relationship.

(5) The information processing apparatus according to any one of (2) to (4), wherein the information presentation unit is configured to change and present a display of the information about the correspondence relationship at the predetermined observation point based on the number of correspondence relationships acquired between the predetermined observation point and the observation point adjacent to that observation point as the information about the correspondence relationship.

(6) The information processing apparatus according to (5), wherein the information presentation unit is configured to present information about the correspondence relationship at the predetermined observation point as a change in color.

(7) The information processing apparatus according to (5), wherein the information presentation unit is configured to present information about the correspondence relationship at the predetermined observation point as a change in grayscale.

(8) The information processing apparatus according to any one of (2) to (7), wherein the information presentation unit is configured to present information about the correspondence relationship between the predetermined observation point and the observation point adjacent to that observation point in graphical form projected on a spherical surface.

(9) The information processing apparatus according to any one of (1) to (8), wherein the correspondence relationship acquisition unit is configured to, when acquiring a correspondence relationship for the feature points based on images from among adjacent observation points, use information about a feature quantity of the feature points.

(10) The information processing apparatus according to any one of (1) to (9), wherein the image acquisition unit is configured to acquire images about the predetermined object from an observation point selected based on information about the correspondence relationship presented by the information presentation unit.

(11) An information processing method including:
acquiring images captured from a plurality of observation points for a predetermined object;
extracting a feature point in each of the images acquired in the image acquisition step;
acquiring a correspondence relationship of the feature points based on images from among adjacent observation points; and
quantitatively presenting information about the correspondence relationship acquired in the correspondence relationship acquisition step.

(12) A computer program for causing a computer to execute:
acquiring images captured from a plurality of observation points for a predetermined object;
extracting a feature point in each of the images acquired in the image acquisition step;
acquiring a correspondence relationship of the feature points based on images from among adjacent observation points; and
quantitatively presenting information about the correspondence relationship acquired in the correspondence relationship acquisition step.

The present disclosure contains subject matter related to that disclosed in Japanese Priority Patent Application JP 2012-024773 filed in the Japan Patent Office on Feb. 8, 2012, the entire content of which is hereby incorporated by reference.

What is claimed is:

1. An information processing apparatus comprising:
an image acquisition unit configured to acquire images captured from a plurality of observation points for a predetermined object;
a feature point extraction unit configured to extract a feature point in each of the images acquired by the image acquisition unit;
a correspondence relationship acquisition unit configured to acquire a correspondence relationship of the feature points based on images from among adjacent observation points; and
an information presentation unit configured to quantitatively present information about the correspondence relationship acquired by the correspondence relationship acquisition unit.

2. The information processing apparatus according to claim 1, wherein
the information presentation unit is configured to quantitatively present information about the correspondence relationship between a predetermined observation point and an observation point adjacent to that observation point.

3. The information processing apparatus according to claim 2, wherein
the information presentation unit is configured to present a line that links the feature points as the information about the correspondence relationship.

4. The information processing apparatus according to claim 2, wherein
the information presentation unit is configured to virtually generate and present an image from an observation point between the predetermined observation point and the observation point adjacent to that observation point as the information about the correspondence relationship.

5. The information processing apparatus according to claim 2, wherein the information presentation unit is configured to change and present a display of the information about the correspondence relationship at the predetermined observation point based on the number of correspondence relationships acquired between the predetermined observation point and the observation point adjacent to that observation point as the information about the correspondence relationship.

6. The information processing apparatus according to claim 5, wherein
the information presentation unit is configured to present information about the correspondence relationship at the predetermined observation point as a change in color.

7. The information processing apparatus according to claim 5, wherein
the information presentation unit is configured to present information about the correspondence relationship at the predetermined observation point as a change in grayscale.

8. The information processing apparatus according to claim 2, wherein
the information presentation unit is configured to present information about the correspondence relationship between the predetermined observation point and the observation point adjacent to that observation point in graphical form projected on a spherical surface.

9. The information processing apparatus according to claim 1, wherein
the correspondence relationship acquisition unit is configured to, when acquiring a correspondence relationship for the feature points based on images from among adjacent observation points, use information about a feature quantity of the feature points.

10. The information processing apparatus according to claim 1, wherein
the image acquisition unit is configured to acquire images about the predetermined object from an observation point selected based on information about the correspondence relationship presented by the information presentation unit.

11. A non-transitory computer readable medium having stored thereon, a computer program having at least one code section executable by a computer, thereby causing the computer to perform steps comprising:
acquiring images captured from a plurality of observation points for a predetermined object;
extracting a feature point in each of the images acquired in the image acquisition step;
acquiring a correspondence relationship of the feature points based on images from among adjacent observation points; and
quantitatively presenting information about the correspondence relationship acquired in the correspondence relationship acquisition step.

* * * * *